Figure 1:
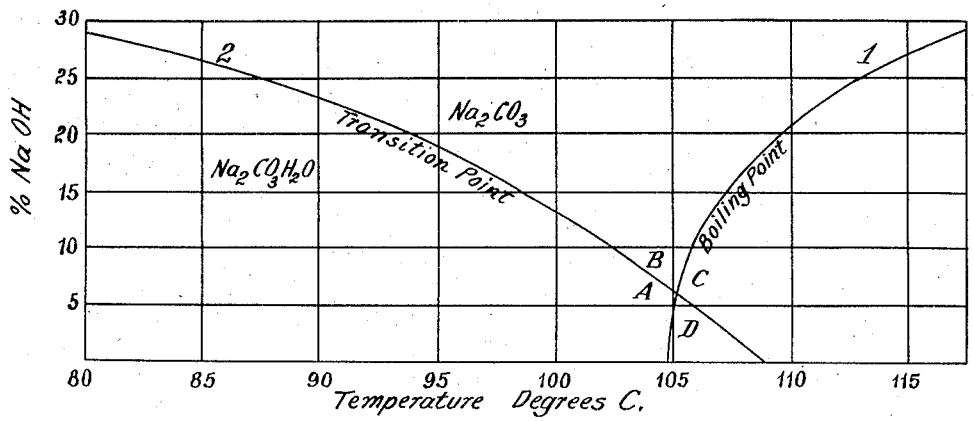

Oct. 18, 1938.　　　P. A. KEENE ET AL　　　2,133,455
PRODUCTION OF DENSE SODA ASH
Filed May 7, 1935　　　2 Sheets-Sheet 1

Transition Temperatures and Boiling Points in presence of NaOH. Solutions saturated with Sodium Carbonate Transition Temperatures and Boiling Points in presence of NaCl. Solutions saturated with Sodium Carbonate

INVENTORS
PAUL A. KEENE
ARLIE P. JULIEN
BY
ATTORNEY

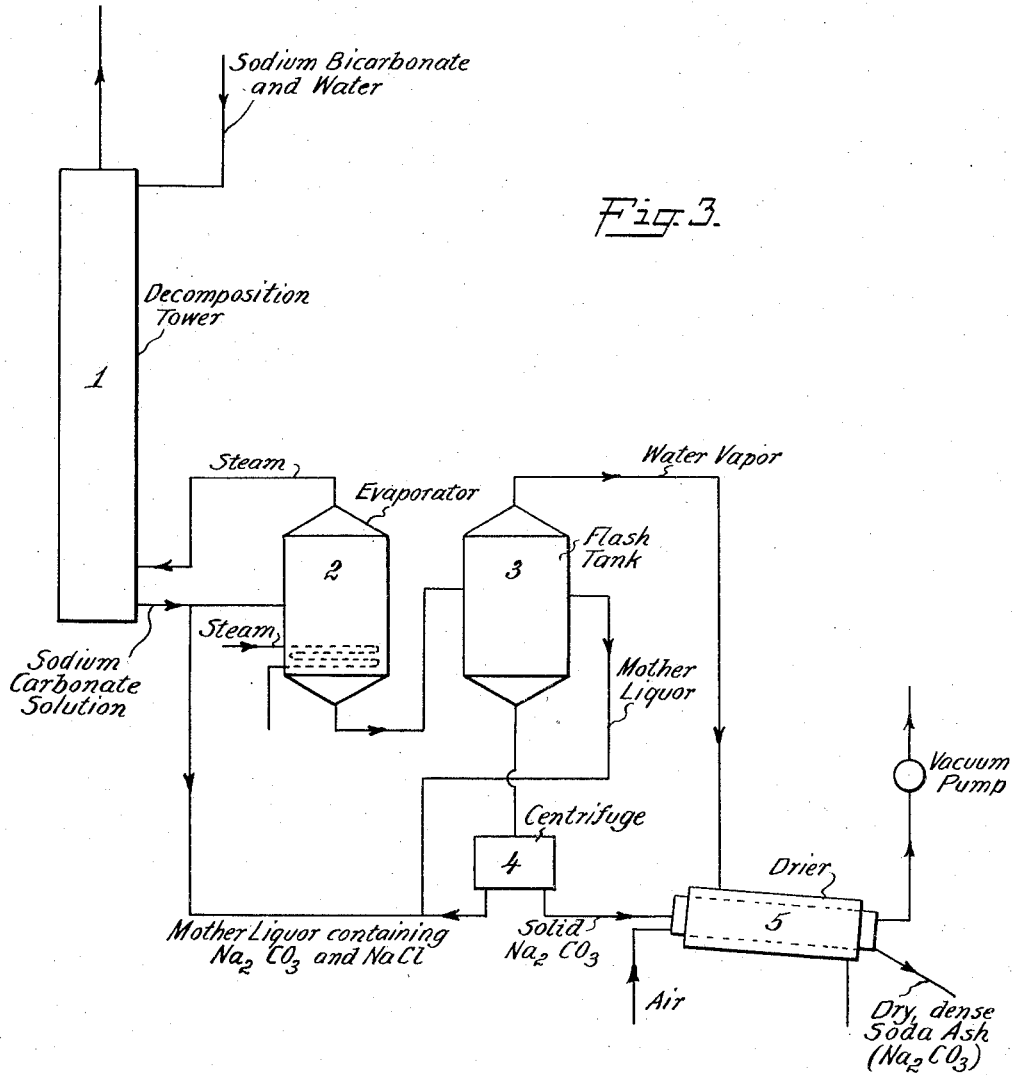

Patented Oct. 18, 1938

2,133,455

UNITED STATES PATENT OFFICE 2,133,455

PRODUCTION OF DENSE SODA ASH

Paul A. Keene and Arlie P. Julien, Syracuse, N. Y., assignors to The Solvay Process Company, New York, N. Y., a corporation of New York Application May 7, 1935, Serial No. 20,291

5 Claims. (Cl. 23—63)

This invention relates to a process for the production of crystalline soda ash having a desired relatively high density.

Soda ash manufactured by heating precipitated sodium bicarbonate produced by the ammonia-soda process ordinarily has a density corresponding to about 500 to 650. (The densities herein given are the apparent densities, as customarily given in the art, in terms of the weight in grams of a liter of the substance when loosely packed.) For many purposes it is desired to have a soda ash of greater density than that obtained in the manner described above. It is also desirable that the product be composed of relatively hard and tough crystals and that it be substantially free from dust-like particles. The presence of large quantities of fine particles either in the original soda ash or formed by disintegration of the material during its packaging and transportation, is particularly disadvantageous in a soda ash used for making glass.

Various procedures have heretofore been employed to produce a relatively dense soda ash by fusing or sintering the ordinary ammonia soda ash, but these methods are costly and tend to introduce impurities into the product, due to contamination of the soda ash from the containers or fuel used in fusing or sintering it. Another method of preparing a relatively dense soda ash is by adding to the light ash, a relatively small proportion of water such that the water is combined with the ash to form sodium carbonate monohydrate crystals. The resulting substantially dry mass of hydrated crystals are then heated until the crystals are decomposed and the water evaporated. The product of this treatment has a density up to approximately 1000 as compared with a density of 500 to 650 for the soda ash prior to the treatment. Due to this process of manufacture, the dense soda ash formed consists of particles which are porous and spongy in character and which tend to disintegrate on handling.

It is an object of this invention to prepare a soda ash of relatively high density composed of hard particles resistant to dusting under the conditions ordinarily encountered in packaging and marketing of soda ash. It is a further object of this invention to provide a process for the transformation of relatively light soda ash into a granular, crystalline product having a relatively higher density, without necessitating fusion or high heating of the soda ash. Other objects of the invention will in part be obvious and will in part appear hereinafter.

We have discovered that the desired dense crystalline soda ash product may be prepared from sodium carbonate solutions by evaporating a solution of sodium carbonate containing another soluble material which lowers the vapor pressure of the solution to crystalline solid sodium carbonate in the form of the anhydrous salt and separating the solid thus formed from the mother liquor while maintaining the solid at a temperature above the transition temperature of monohydrated sodium carbonate to anhydrous sodium carbonate in contact with the mother liquor. The evaporation of the solution and crystallization of the sodium carbonate may take place under atmospheric pressure or under a pressure above or below atmospheric. The solution may originally contain suspended therein solid monohydrated sodium carbonate which is converted into anhydrous sodium carbonate by the heated solution. Thus, as a starting material for carrying out this invention, we may employ a slurry of the monohydrate containing sodium carbonate and another soluble material dissolved in the liquid portion of the slurry. The amount of the material other than the sodium carbonate dissolved in the solution may vary but should be such that after the evaporation has been carried to a desired extent and the solid anhydrous salt is to be separated from the mother liquor, this mother liquor contains sufficient of the additional material to lower the transition temperature of monohydrated sodium carbonate to anhydrous sodium carbonate in contact with said liquor to below the boiling point of the liquor at atmospheric pressure. Under these conditions the solid may be maintained at a temperature above this transition temperature while being separated from the mother liquor without it being necessary to carry out this separation under elevated pressures to prevent boiling of the liquor in the filters or other device used for this purpose.

This invention also comprises a process whereby sodium bicarbonate, particularly the bicarbonate product of the ammonia soda process, may be converted into a dense crystalline soda ash by a procedure economic with respect to its heat requirements and in which the conversion of the bicarbonate to the solid anhydrous carbonate is carried out in aqueous solutions. In carrying out this feature of the invention, a solution of sodium carbonate is evaporated under a pressure above atmospheric to crystallize out anhydrous sodium carbonate and form a mixture or slurry of the solid and mother liquor.

The solution during its concentration contains dissolved therein an additional material in amount such that the mother liquor contains sufficient of this material to lower the transition temperature to below the boiling point of the mother liquor at atmospheric pressures. The mixture of mother liquor and solid is then passed to a filter or other device wherein the solid is separated from the liquor under atmospheric pressure while the solid is maintained at a temperature above said transition temperature. Instead of having the additional material in the sodium carbonate solution during the crystallization of the anhydrous salt, it may be added to the slurry or mixture of anhydrous salt and mother liquor just prior to separating the solid from the mother liquor. The steam evolved by boiling the sodium carbonate solution, and having a temperature above 100° C. due to its being generated under a pressure above atmospheric, is passed into a solution or slurry of sodium bicarbonate to decompose the bicarbonate to form a solution of sodium carbonate. This treatment of the bicarbonate with steam, at least in its final stages with respect to the bicarbonate decomposition, is also carried out under a pressure above atmospheric, whereby the high temperature of the steam may be utilized in promoting the bicarbonate decomposition.

Figure 2:
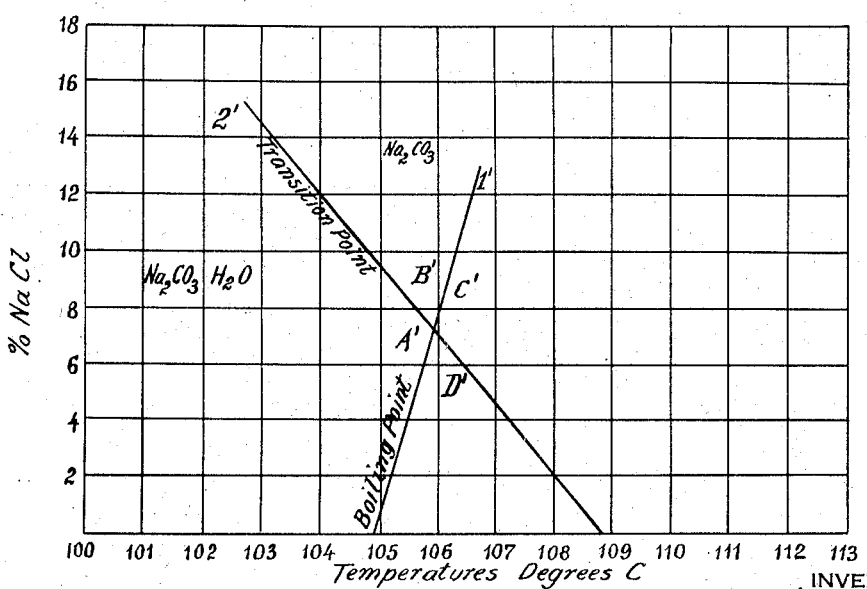

In order to make clear the mode of operating to produce dense soda ash in accordance with the present invention, reference is had to Figs. 1 and 2 of the accompanying drawings in which is plotted the transition point and boiling point data for the systems $Na_2CO_3$—NaOH—$H_2O$ (Fig. 1) and $Na_2CO_3$—NaCl—$H_2O$ (Fig. 2), and the following discussion of the data of this drawing. Fig. 3 of the drawings shows an apparatus suitable for carrying out the process of this invention in accordance with the procedure hereinafter described in detail as Example II.

Anhydrous sodium carbonate does not exist in equilibrium with its own saturated solution at ordinary atmospheric pressure, for the reason that the transition temperature from $Na_2CO_3.H_2O$ to anhydrous $Na_2CO_3$ lies above the normal boiling point (the boiling point of the solution under the existing atmospheric pressure) of a saturated aqueous solution of pure sodium carbonate. A saturated solution of sodium carbonate boils under 760 mm. mercury pressure at a temperature of approximately 104.9° C. The transition temperature from $Na_2CO_3.H_2O$ to anhydrous $Na_2CO_3$ in contact with a saturated aqueous solution of pure sodium carbonate has been reported by various investigators to be from 107° to 112.5° C. Our investigations lead us to believe that the true transition temperature lies at approximately 109° C.

The data obtained by us and shown in the accompanying drawings, shows that the addition of certain other soluble substances to a saturated aqueous solution of sodium carbonate, however, will cause a reduction in its vapor pressure. This results not only in an elevation of its normal boiling point, but also in a reduction of the transition temperature from $Na_2CO_3.H_2O$ to anhydrous $Na_2CO_3$. In Fig. 1 is shown the boiling point curve 1 under 760 mm. mercury pressure of aqueous solutions saturated with sodium carbonate and containing also various percentages of NaOH. There is also shown the curve 2 of the transition point temperatures for $Na_2CO_3.H_2O$ to anhydrous $Na_2CO_3$ in contact with solutions saturated with sodium carbonate and containing also various percentages of NaOH. Thus, all points to the left of the boiling point curve represent solutions at temperatures at which their vapor pressures are below 760 mm. of mercury, and hence do not boil at normal atmospheric pressure. All points to the right of the boiling point curve represent solutions at temperatures at which their vapor pressures are above 760 mm. of mercury and hence boil at normal atmospheric pressure. For solutions represented by all points below the transition point curve the stable solid phase in contact with the solution is $Na_2CO_3.H_2O$, while all points above the transition point curve represent solutions in which anhydrous $Na_2CO_3$ is the stable solid phase in contact with the solution. Thus in area A the monohydrate is in equilibrium with the solutions all of which are at temperatures such that their vapor pressure is less than 760 mm. mercury pressure, while in area B anhydrous sodium carbonate is in equilibrium with the solutions which are at temperatures such that their vapor pressures are less than 760 mm. mercury pressure. For solutions in area C, anhydrous sodium carbonate is in equilibrium with solutions having vapor pressures above 760 mm. of mercury, while for area D, monohydrate is in equilibrium with solutions having vapor pressures above 760 mm. of mercury. The solutions in areas A and B do not boil and those in areas C and D do boil under normal atmospheric pressure.

Fig. 2 is constructed similarly to Fig. 1 and represents aqueous solutions saturated with sodium carbonate and containing also various percentages of NaCl. The areas A', B', C', and D' represent exactly the same conditions as described above for the corresponding areas A, B, C and D of Fig. 1. It is apparent that the boiling point curves 1 and 1' will shift somewhat with changes in the atmospheric pressure which vary the temperatures at which the solutions exposed to this pressure boil.

In area B, that is, above the transition point curve and at the left of the boiling point curve, it is possible to have anhydrous sodium carbonate in equilibrium with properly constituted solutions, without maintaining the solution under a pressure higher than atmospheric. It is this area that is utilized in the present invention. NaOH and NaCl as described above, are chosen for illustrative purposes only and it is not to be understood that these are the only substances capable of producing the effect covered by this invention. Any soluble material, which acts to lower the vapor pressure of the sodium carbonate solution and thereby produces the desired results (for example, sodium nitrate, sodium silicate, or sodium phosphate), may be employed in place of the caustic soda or sodium chloride referred to above.

The areas and boundaries designated in Figs. 1 and 2 have been located to illustrate the principle described, rather than from the standpoint of absolute technical accuracy, although it is believed that the boundaries are reasonably exact as indicated, since they have been set by data obtained in the course of a long continued investigation of the solid phases which are stable in contact with solutions of sodium carbonate containing sodium chloride or caustic soda at various temperatures and concentrations of solutions.

In making soda ash in accordance with this invention any one of several procedures may be employed. For example, a solution of sodium carbonate containing sodium hydroxide or sodium chloride and having a composition and temperature represented by a point within areas B or C of Fig. 1 or areas B' or C' of Fig. 2, is boiled to evaporate water and crystallize out anhydrous sodium carbonate. For solutions having compositions and temperatures within areas B or B', this evaporation is carried out under a reduced pressure below atmospheric. For solutions having compositions and temperatures within areas C or C' the evaporation is carried out under a pressure above normal atmospheric pressure (760 mm. of mercury). For solutions having compositions and temperatures on the boundary between areas B and C or B' and C' (points representing these conditions lying along curves 1 or 1') the solutions are boiled under normal atmospheric pressure. If the solutions originally contain less than about 6% sodium hydroxide or less than about 7% sodium chloride, the evaporation is carried out under a pressure above atmospheric until the mother liquor contains about 6% or more sodium hydroxide or about 7% or more sodium chloride. The pressure on the solution may then be released, which will cause evaporation of additional water and cooling of the solution to its boiling point under atmospheric pressure. If the sodium carbonate solution originally contained no sodium hydroxide or sodium chloride, simultaneously with or prior to releasing the pressure on the solution, the requisite amount of sodium hydroxide or sodium chloride is introduced into the mixture of solid and mother liquor so that the mother liquor contains at least about 6% or 7%, respectively, of the added material. The mixture of solid and mother liquor obtained by any of the methods just described, is then passed to a filter, centrifuge, or other device wherein the solid anhydrous sodium carbonate is separated from the mother liquor under atmospheric pressure, while maintaining the solid at a temperature above the transition temperature of monohydrated sodium carbonate to the anhydrous salt until the quantity of water in the mass of solid salt is reduced to an amount insufficient to convert the mass of solid to monohydrated sodium carbonate. The temperatures and compositions of the mother liquor during the separation of the solid from the liquor are represented by points within areas B or B' of Figs. 1 and 2, and by points along the boiling point curves 1 and 1' above the intersection of these curves with the transition point curves 2 and 2'.

The following examples describe in greater detail processes for the production of dense crystalline soda ash in accordance with this invention.

*Example I.*—A solution containing 10% NaCl and 14% Na$_2$CO$_3$ is heated to boil it under atmospheric pressure. When the evaporation has proceeded until the solution contains approximately 18% Na$_2$CO$_3$, it will be saturated with sodium carbonate and further evaporation will cause anhydrous Na$_2$CO$_3$ to crystallize out. The boiling of the solution is interrupted before sodium chloride begins to crystallize out and the solid anhydrous sodium carbonate is separated from the hot mother liquor while maintaining the solid at a temperature above the transition temperature of monohydrated sodium carbonate to the anhydrous form in contact with the mother liquor. Due to the presence of the sodium chloride in the mother liquor, this separation may be carried out at a temperature below the boiling point of the mother liquor while still operating at a temperature above the transition temperature of the sodium carbonate.

The mother liquor may be used for the production of further quantities of anhydrous crystalline dense ash by adding to it sodium carbonate and water in proportions such that a solution having a composition corresponding to the starting solution described above is obtained (containing 10% NaCl and 14% Na$_2$CO$_3$) or to the composition of this solution after it was evaporated to contain about 18% Na$_2$CO$_3$.

The process of this example may also be modified, if desired, to continuously supply to the boiling sodium chloride-sodium carbonate solution a solution of sodium carbonate in water at a rate such that the water thus introduced corresponds to that evaporated from the solution. As the sodium carbonate is crystallized out, it may be separated from the mother liquor which thus serves as a pool in which the crystalline carbonate is recovered from the solution supplied thereto.

*Example II.*—Referring to Fig. 3 of the drawings, the apparatus shown therein for carrying out the process of the present invention includes tower 1, evaporator 2, flash tank 3, centrifuge 4 and drier 5. A slurry of crude sodium bicarbonate from the ammonia-soda process and water is introduced into the top of tower 1 and, as it passes downwardly through this tower, is treated by steam introduced at the bottom of the tower from evaporator 2, to decompose the bicarbonate forming sodium carbonate and carbon dioxide, which latter product escapes from the top of the tower. From the bottom of the tower, there is withdrawn a solution of sodium carbonate which may contain a small proportion of undecomposed bicarbonate. This solution is introduced into evaporator 2, where it is mixed with a saturated solution of sodium carbonate containing dissolved therein sodium chloride. This solution is heated by high pressure steam to evaporate it and crystallize out sodium carbonate. The steam evolved in this evaporation passes into the bottom of tower 1 for the decomposition of the bicarbonate introduced into this tower. Tower 1 is of substantial height and a column of liquid is maintained in this tower such that the pressure in the bottom of the tower where the steam from the evaporator enters is above atmospheric. Since the pressure in tower 1 progressively increases from the top of the tower (where it is about atmospheric) to the bottom, the temperature of treatment of the bicarbonate progressively increases, with the highest temperature, corresponding to the boiling point of the solution, at the bottom of tower 1. This procedure facilitates obtaining a relatively complete decomposition of the bicarbonate in tower 1 with a minimum amount of steam being required for this purpose. As a result, the process may be operated with a balance between the amount of steam evolved in evaporating the solution in evaporator 2 and that required for decomposition of sodium bicarbonate in tower 1. Since all of the water introduced into the process liquors in the system plus that evolved in the decomposition of the sodium bicarbonate, must be evaporated in order to obtain the desired dry soda ash product, it is particularly advantageous to operate under conditions such that the steam evolved in the evaporator suffices for the decomposition of the bicarbonate. The process, however, may be operated supplying additional steam to tower 1 or generating in evaporator 2 more than enough steam for the bicarbonate decomposition, in which case the excess steam may be withdrawn from this process and utilized as may be desired.

The slurry of crystallized anhydrous sodium carbonate and mother liquor containing dissolved sodium chloride is passed from evaporator 2 to a flash tank 3 where the hot slurry is exposed to atmospheric pressure. Some of the water in the slurry evaporates and passes off from the top of the flash tank, the remainder of the slurry being cooled to or below the boiling point of the mother liquor under atmospheric pressure. As a result of the further concentration of the slurry in the flash tank additional sodium carbonate crystallizes out. The crystallized sodium carbonate and mother liquor passes from flash tank 3 to centrifuge 4 where the solid and liquor are separated. This separation is accomplished while the solid is at a temperature above the transition temperature of monohydrated sodium carbonate to anhydrous sodium carbonate in contact with the mother liquor. The mother liquor from the centrifuge is returned to evaporator 2, and mixed with sodium carbonate solution coming from tower 1. In order to relieve the burden on the centrifuge, flash tank 3 may be operated as a thickener and a preliminary separation of some of the mother liquor from the crystals accomplished in this tank. This mother liquor is returned to evaporator 2 with the mother liquor recovered from filter 4.

The crystals from the centrifuge, containing about 3% moisture, pass to drier 5 where they are treated with air to dry them. The water vapor evolved in flash tank 3 may be utilized for heating the material in the drier by passing it into a jacket surrounding the drier. The air may be heated before passing into the drier. If desired, a reduced pressure may be maintained in the drier to further facilitate the removal of moisture from the crystals.

In carrying out the process described in this example, the following conditions with respect to composition of the materials treated in the various steps of the process are particularly advantageous.

Composition of sodium bicarbonate slurry entering tower 1:

|  | Percent |
|---|---|
| $NaHCO_3$ | 47.3 |
| $H_2O$ | 52.2 |
| $NH_3$, $NaCl$, etc | .5 |

Composition of sodium carbonate solution leaving the bottom of tower 1:

|  | Percent |
|---|---|
| $Na_2CO_3$ | 23.8 |
| $NaHCO_3$ | 5.9 |
| $NaCl$ | .05 |
| $H_2O$ | 70.3 |

The mixture of this solution and mother liquor returned from the centrifuge and flash tank is introduced into a body of liquor undergoing evaporation in evaporator 2 at a rate such that the solution which is undergoing evaporation has approximately the following composition:

|  | Percent |
|---|---|
| $Na_2CO_3$ | 18.1 |
| $NaHCO_3$ | 2.7 |
| $NaCl$ | 9.9 |
| $H_2O$ | 69.3 |

The sodium carbonate product recovered from the centrifuge and drier contains a small proportion of $NaCl$, due to the mother liquor retained by the crystals. The product contains substantially no $NaHCO_3$, the undecomposed bicarbonate in the sodium carbonate solution from tower 1 is substantially completely decomposed during the evaporation of the solution in evaporator 2 under pressure. The pressure maintained in the evaporator to promote the decomposition of the bicarbonate may be upwards to 40 lbs. per square inch (gauge) and is preferably about 25 lbs. per square inch. This decomposition of sodium bicarbonate in the evaporator prevents an excessive accumulation of the bicarbonate in the recirculated process liquors.

We claim:

1. The process for the production of crystalline dense soda ash from sodium bicarbonate which comprises boiling to evaporate a sodium carbonate solution containing another soluble substance from the group consisting of the salts and hydroxides of the alkali metals, said evaporation of the solution being carried out under a pressure in excess of atmospheric such that the transition temperature of monohydrated sodium carbonate to anhydrous sodium carbonate in contact with said solution is below the temperature at which the solution is evaporated and being continued until there is separated from the solution a solid product consisting of hard crystals of sodium carbonate having a composition substantially corresponding to the formula $Na_2CO_3$, withdrawing the steam evolved during the aforesaid evaporation of the sodium carbonate solution from the zone in which the solution is boiled and in a separate zone passing the steam in direct contact with a slurry of sodium bicarbonate to decompose the bicarbonate and to form sodium carbonate, discontinuing the evaporation of the solution at a time when said soluble substance is present in amount sufficient to lower said transition temperature to below the boiling point of the solution at atmospheric pressures, separating at a pressure not above atmospheric mother liquor from the crystallized anhydrous sodium carbonate while maintaining the carbonate at a temperature at which it remains as crystalline anhydrous sodium carbonate, and, in repeating the foregoing operations, introducing the sodium carbonate formed by decomposition of sodium bicarbonate into the mother liquor separated from the anhydrous sodium carbonate and boiling the thus formed solution of sodium carbonate containing the aforesaid other soluble substance to crystallize from the solution additional amounts of the aforesaid solid product consisting of crystals of anhydrous sodium carbonate and when there is any undecomposed sodium bicarbonate in the sodium carbonate introduced into the mother liquor and this bicarbonate is not decomposed by the presence of a hydroxide in the mother liquor, continuing the boiling of the solution until the bicarbonate is substantially completely decomposed to form said solid product consisting of anhydrous sodium carbonate.

2. The process for the production of crystalline dense soda ash from sodium bicarbonate which comprises boiling to evaporate a solution of sodium carbonate containing sodium chloride under a pressure in excess of atmospheric such that the transition temperature of monohydrated sodium carbonate to anhydrous sodium carbonate in contact with said solution is below the temperature at which the solution is evaporated, continuing the evaporation of the solution until there is crystallized therefrom a solid product consisting of hard crystals of anhydrous sodium carbonate having a composition substantially corresponding to the formula $Na_2CO_3$ and the mother liquor from which the crystals form contains at least 7% sodium chloride, withdrawing the steam evolved during the boiling of said solution from the zone in which the solution is boiled and in a separate zone passing the steam in direct contact with a slurry of sodium bicarbonate to decompose the bicarbonate and from sodium carbonate, discontinuing the evaporation of the solution, lowering the pressure on the solution to not above atmospheric, separating at the lowered pressure mother liquor from the crystallized anhydrous sodium carbonate while maintaining the carbonate at a temperature at which it remains as crystalline anhydrous sodium carbonate, and in repeating the foregoing operations, introducing the sodium carbonate formed by decomposition of sodium bicarbonate into the mother liquor containing sodium chloride separated from the anhydrous sodium carbonate, boiling to evaporate the solution of sodium carbonate thus formed and when said solution contains any undecomposed sodium bicarbonate which may have accompanied the sodium carbonate introduced into said mother liquor, continuing to boil said solution until the sodium bicarbonate is substantially completely decomposed and there is crystallized from the solution additional amounts of the aforesaid solid product consisting of crystals of anhydrous sodium carbonate.

3. The process for the production of crystalline dense soda ash from sodium bicarbonate which comprises passing steam into a slurry of sodium bicarbonate to decompose the bicarbonate and form a solution of sodium carbonate, recirculating a solution of sodium carbonate and sodium chloride in a cyclic system in which the aforesaid solution of sodium carbonate is mixed with the recirculating solution, the mixture is introduced into a pool of saturated sodium carbonate solution containing above about 7% NaCl which is boiled under a pressure above atmospheric to evaporate water in the sodium carbonate solution introduced into the pool, and to maintain the concentration of sodium chloride in the evaporating solution above about 7%, continuing to boil the solution of sodium carbonate and sodium chloride in said pool until there is crystallized from the solution in the pool a solid product consisting of hard crystals of anhydrous sodium carbonate having a composition substantially corresponding to the formula $Na_2CO_3$ and when the first mentioned solution of sodium carbonate contains undecomposed bicarbonate continuing to boil the solution in said pool until the bicarbonate is substantially completely decomposed, reducing the pressure on the resulting mixture of solid and mother liquor to atmospheric, separating at atmospheric pressure the solid and mother liquor while maintaining the solid at a temperature at which it remains as crystalline anhydrous sodium carbonate, withdrawing the steam evolved under pressure in the evaporation of the sodium carbonate-sodium chloride solution from the zone in which the solution is boiled and in a separate zone passing the steam in contact with a sodium bicarbonate slurry to decompose the bicarbonate, and repeating the steps hereinbefore described by recycling in said system the aforesaid mother liquor, adding to the recycled mother liquor the sodium carbonate solution obtained by decomposition of bicarbonate and crystallizing and recovering anhydrous sodium carbonate from the mixed solutions.

4. The process for the production of crystalline dense soda ash from sodium bicarbonate which comprises boiling to evaporate a solution of sodium carbonate containing another soluble substance from the group consisting of the salts and hydroxides of the alkali metals, said soluble substance being present in the solution in amount sufficient to lower the transition temperature of monohydrated sodium carbonate in contact with said solution to below the temperatures at which the solution is maintained during its evaporation, continuing to evaporate said solution until there is crystallized from the solution a solid product consisting of hard crystals of anhydrous sodium carbonate having a composition substantially corresponding to the formula $Na_2CO_3$, withdrawing the steam evolved during the boiling of said solution from the zone in which the solution is boiled and in a separate zone passing the steam in direct contact with said sodium bicarbonate to decompose the bicarbonate and form sodium carbonate, discontinuing the boiling and evaporation of the solution at a time when said soluble substance is present in amount sufficient to lower said transition temperature to below the boiling point of the solution at atmospheric pressures, separating mother liquor from the crystallized anhydrous sodium carbonate under a pressure not above atmospheric while maintaining the carbonate at a temperature at which it remains as crystalline anhydrous sodium carbonate, and in repeating the foregoing operations, introducing the sodium carbonate formed by decomposition of sodium bicarbonate into the mother liquor separated from the crystallized anhydrous sodium carbonate, and boiling the thus formed solution of sodium carbonate to crystallize from the solution additional amounts of the aforesaid solid product consisting of crystals of anhydrous sodium carbonate and when there is any undecomposed sodium carbonate in the sodium carbonate introduced into the mother liquor and this bicarbonate is not decomposed by the presence of a hydroxide in the mother liquor, continuing the boiling of the solution until the bicarbonate is substantially completely decomposed to form said solid product consisting of anhydrous sodium carbonate.

5. The process for the production of crystalline dense soda ash from sodium bicarbonate which comprises boiling to evaporate a mixture of crystallized sodium carbonate and a solution of sodium carbonate containing another soluble substance from the group consisting of the salts and hydroxides of the alkali metals, continuing to boil and evaporate said mixture until the concentration of said soluble substance in the solution is sufficient to lower the transition temperature of monohydrated sodium carbonate in contact with said solution to below the boiling point of the solution at atmospheric pressure and also to below the temperature at which said mixture is boiled, continuing to boil the mixture of crystallized sodium carbonate and solution containing said soluble substance at a temperature above the transition temperature of monohydrated sodium carbonate in contact with the solution until the solid carbonate material in contact with the solution consists of hard crystals of anhydrous sodium carbonate having a composition substantially corresponding to the formula $Na_2CO_3$, withdrawing the steam evolved during the boiling of said solution from the zone in which the solution is boiled and in a separate zone passing the steam in direct contact with said sodium bicarbonate to decompose the bicarbonate and form sodium carbonate, discontinuing the boiling and evaporation of the solution at a time when said soluble substance is present in amount sufficient to lower said transition temperature to below the boiling point of the solution at atmospheric pressures, separating mother liquor from the crystallized anhydrous sodium carbonate under a pressure not above atmospheric while maintaining the carbonate at a temperature at which it remains as crystalline anhydrous sodium carbonate, and in repeating the foregoing operations, producing from the sodium carbonate formed by decomposition of the sodium bicarbonate and the mother liquor separated from the crystallized anhydrous sodium carbonate the aforementioned mixture of crystallized sodium carbonate and solution of sodium carbonate containing another soluble substance, and in boiling to evaporate said mixture when there is any undecomposed sodium bicarbonate in the sodium carbonate used in producing said mixture and this bicarbonate is not decomposed by the presence of a hydroxide in the mother liquor, continuing the boiling of said mixture until the bicarbonate is substantially completely decomposed and there is formed from the mixture additional amounts of the aforesaid solid product consisting of crystals of anhydrous sodium carbonate.

PAUL A. KEENE.
ARLIE P. JULIEN.

CERTIFICATE OF CORRECTION.

Patent No. 2,133,455.  October 18, 1938.

PAUL A. KEENE, ET AL.

It is hereby certified that error appears in the printed specification of the above numbered patent requiring correction as follows: Page 1, second column, line 6, for "crystalline" read crystallize; page 5, first column, line 7, claim 2, for "from" read form; and second column, line 40, claim 4, for the word "carbonate" read bicarbonate; and that the said Letters Patent should be read with this correction therein that the same may conform to the record of the case in the Patent Office.

Signed and sealed this 6th day of December, A. D. 1938.

Henry Van Arsdale (Seal)  Acting Commissioner of Patents.